March 3, 1959 F. C. FLECK ET AL 2,875,635
POWER PLANT CONTROL MECHANISM
Filed Nov. 19, 1956 4 Sheets-Sheet 1
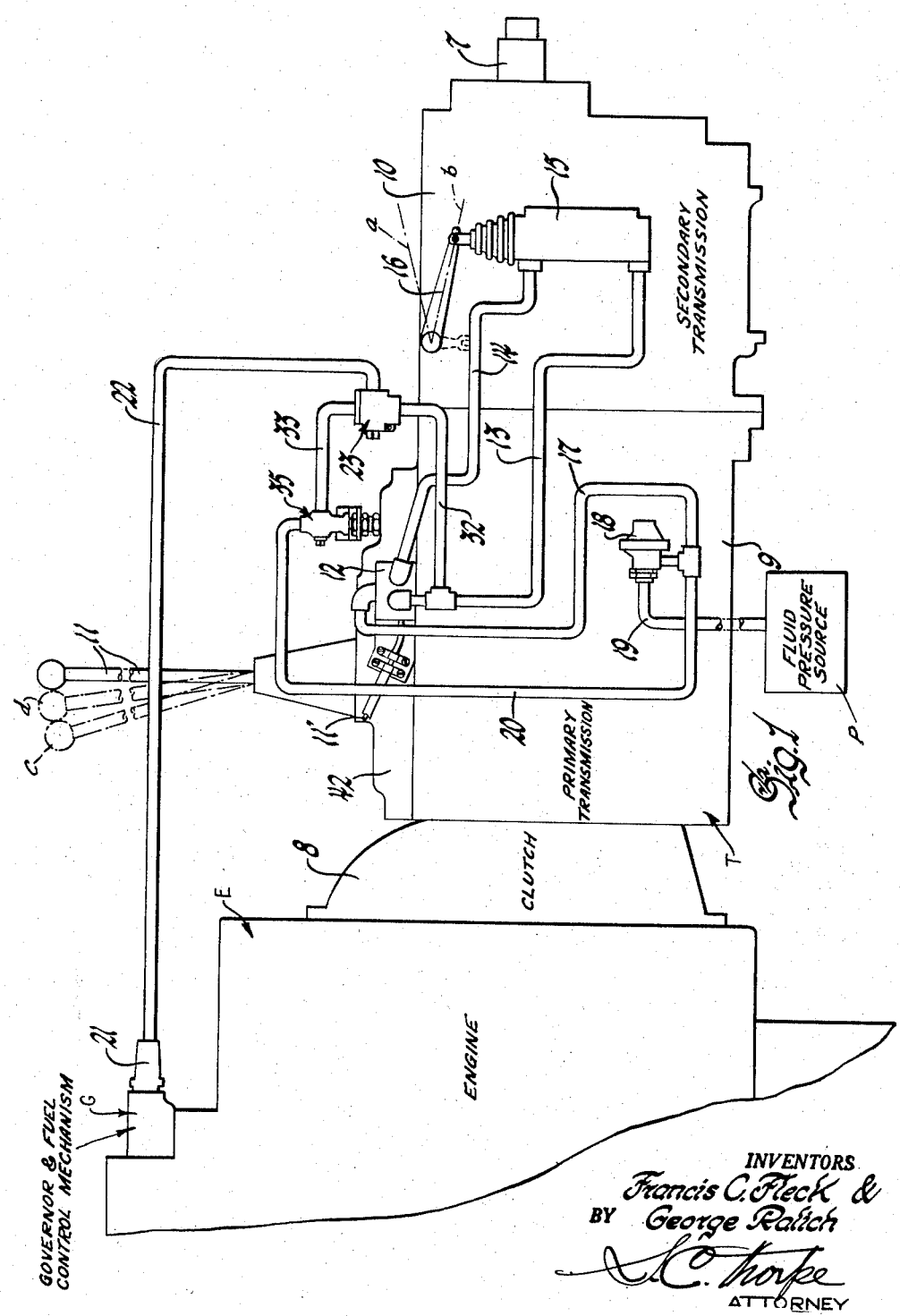
INVENTORS
Francis C. Fleck &
BY George Raitch
ATTORNEY

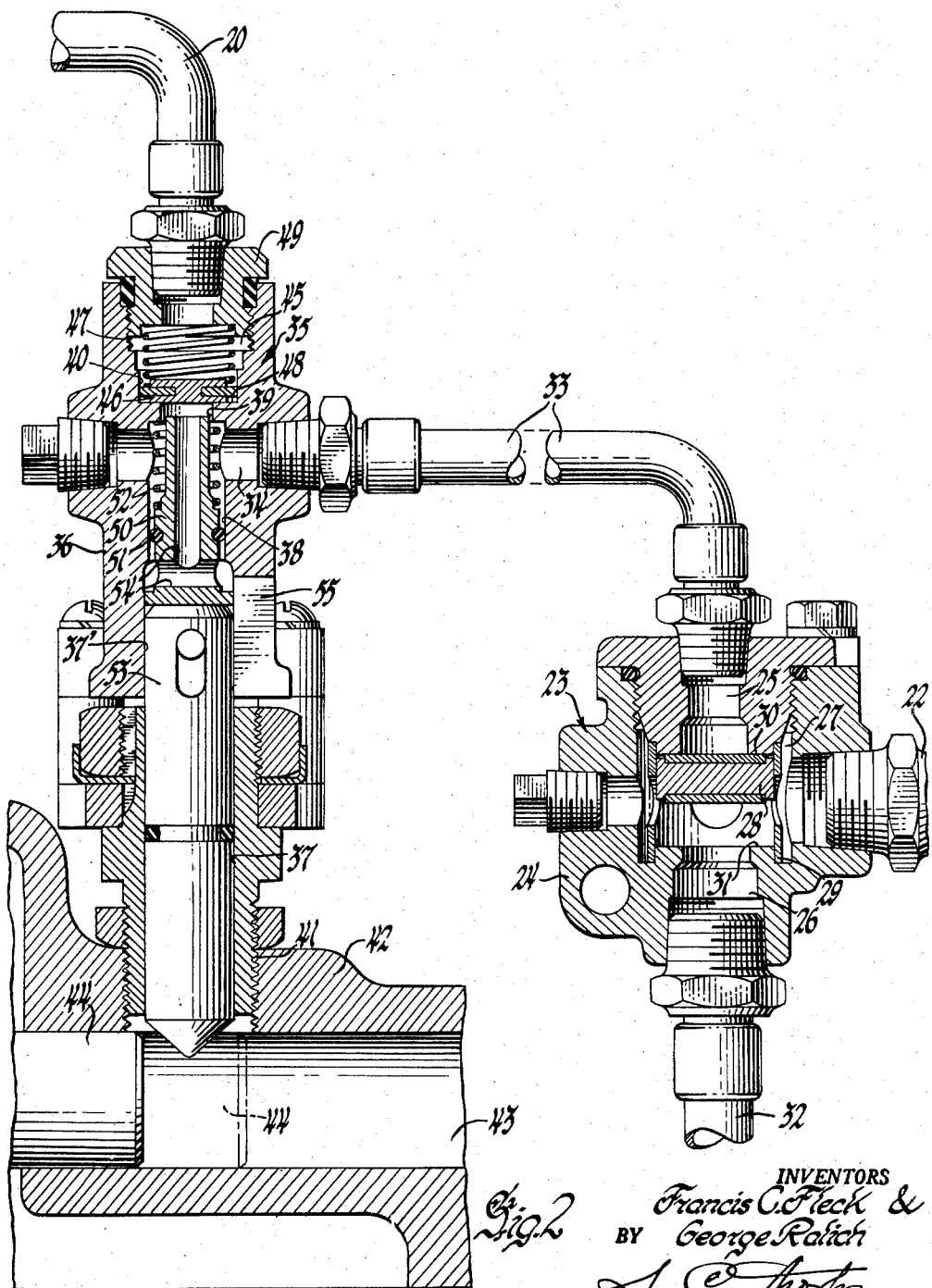

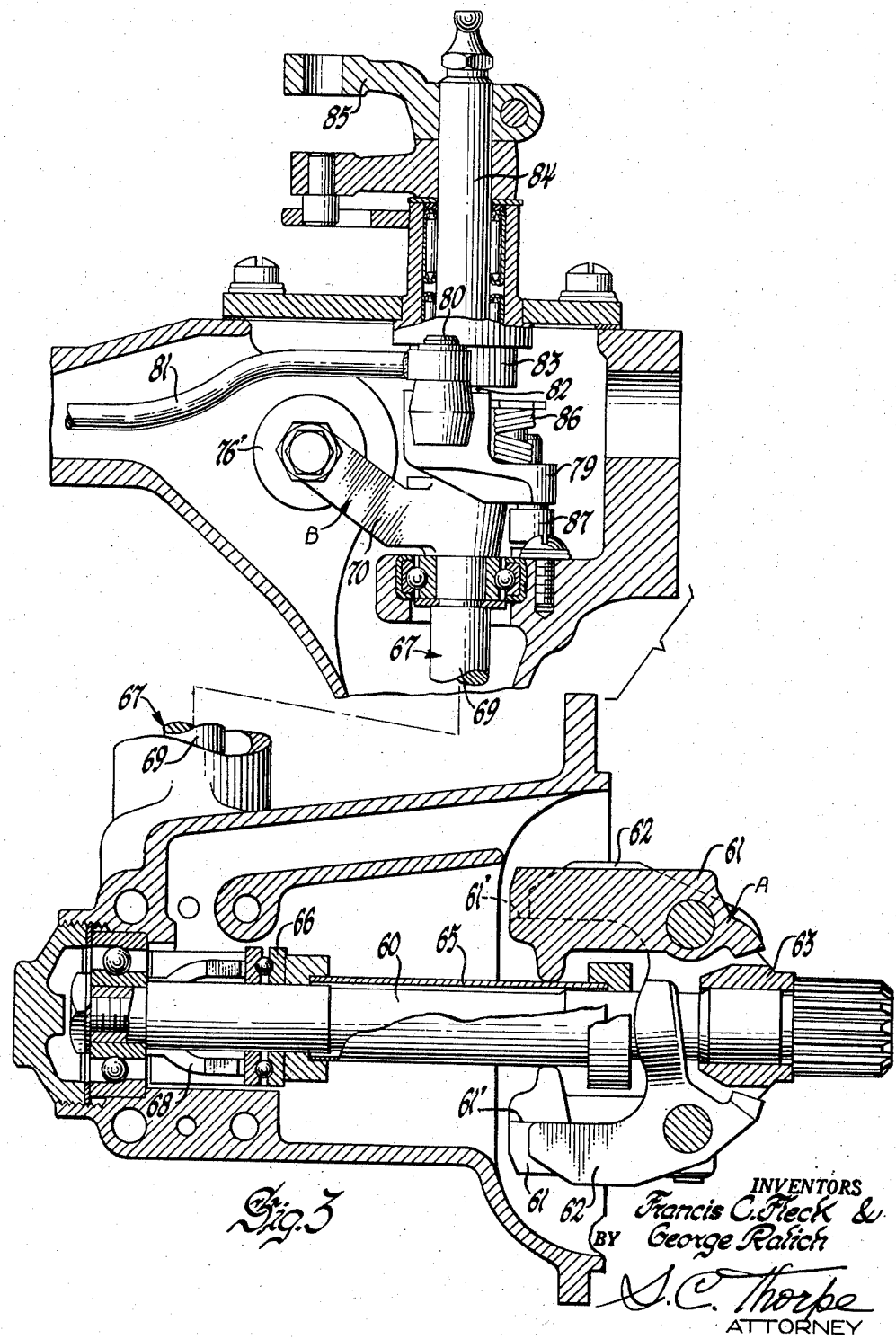

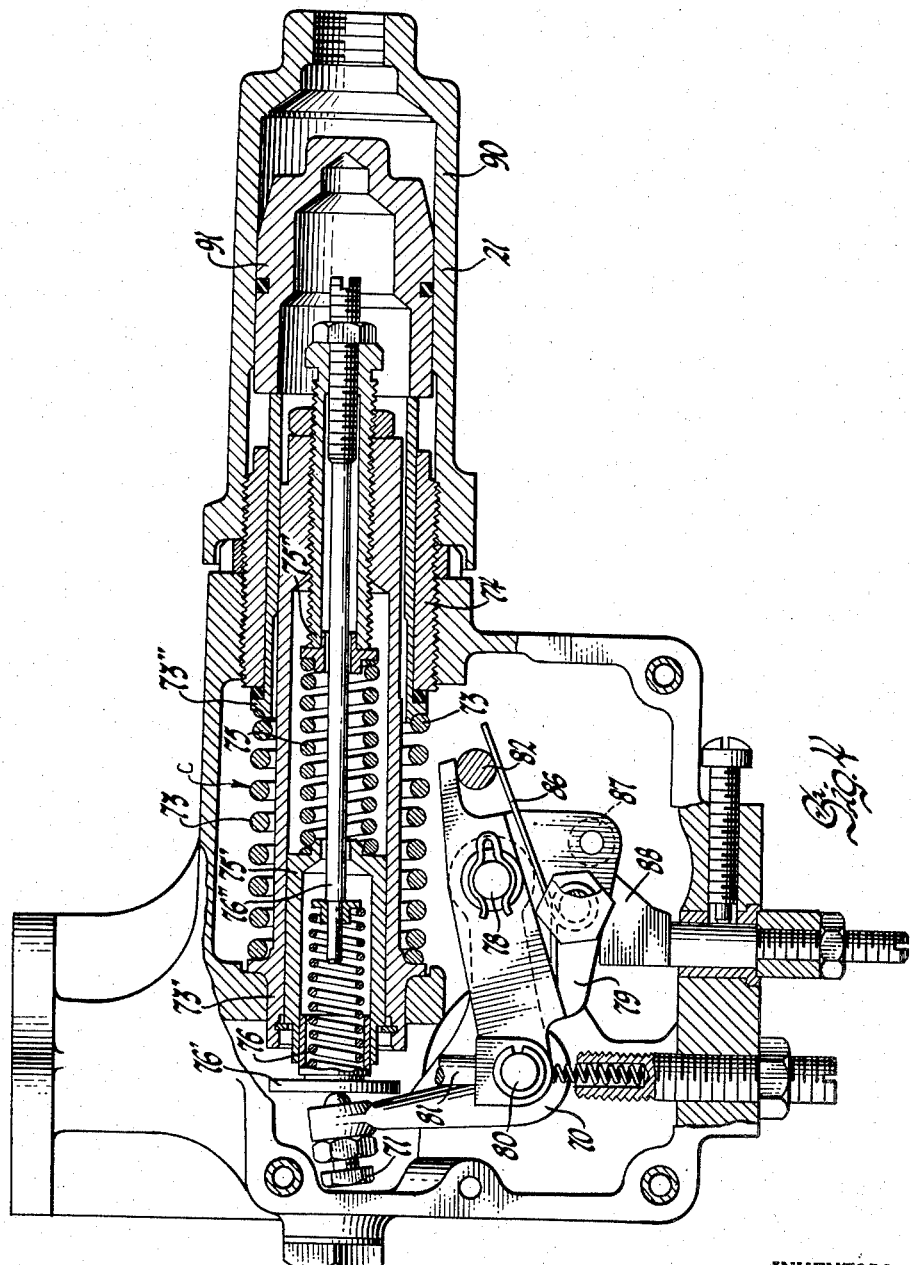

United States Patent Office 2,875,635
Patented Mar. 3, 1959

2,875,635

POWER PLANT CONTROL MECHANISM

Francis C. Fleck and George Ralich, Pontiac, Mich., assignors to General Motors Corporation, Detroit, Mich., a corporation of Delaware Application November 19, 1956, Serial No. 623,112

6 Claims. (Cl. 74—472)

This invention relates generally to a power plant control mechanism and, more particularly, to a governor control mechanism for a power plant including an engine having primary and secondary transmission mechanisms coacting to provide a plurality of power transmitting drive ratios, such power plants normally being used on heavy duty motor vehicles such as buses, trucks, off-the-road construction equipment, etc.

In heavy duty motor vehicle applications, it is generally necessary to provide a governor operable to limit the maximum speed of the vehicle, while at the same time permitting higher engine speeds when the drive through the transmission unit is in its higher transmission gear ratios thereby permitting maximum power output and proper acceleration in the different intermediate speed ranges or gear ratios of the vehicle. In such heavy duty motor vehicles, it has also become common practice to provide several complementary transmission units operating either in series or in parallel to provide multiple speed gear ratios. Such complementary transmission units are of relatively simple and inexpensive design and may be matched to meet the requirements of a multiplicity of applications whereas single transmission units capable of providing the same number of gear ratios are necessarily expensive being of relatively complex construction and of only limited application.

This invention provides an improved control mechanism for a power plant including complementary transmission units having means independently operable to establish different drive ratios through the several units and having a governor control mechanism operable to adjust a governor in response to the drive ratio selection in each of the transmission units to permit the engine to operate at a higher speed limit when the transmissions are coacting to provide low and intermediate speed gear drive ratios but effective to limit the maximum engine speed at a lower value when the transmission units are coacting to provide the high speed gear drive ratio.

The foregoing and other objects, advantages and features of the invention will become apparent and more thoroughly understood from the following description of a preferred embodiment thereof in which reference is made to the attached drawings in which:

Figure 1 is a somewhat diagrammatic view showing a power plant embodying a control mechanism constructed in accordance with the invention;

Figure 2 is an enlarged view of a portion of Figure 1 with poritons thereof broken away and in detailed section;

Figure 3 is an elevational view with portions thereof broken away and in section and showing an engine governor particularly adapted for use with the control mechanism of the invention; and Figure 4 is a longitudinal sectional view of the engine governor taken normal to the plane of Figure 3.

Referring more particularly to the drawings, Figure 1 shows a power plant comprising an engine E and a power transmitting mechanism T. The power transmitting mechanism drivingly interconnects the crankshaft of the engine, not shown, with an output power shaft 7 and includes a coupling device 8 such as a fluid coupling or disconnect clutch, a primary transmission mechanism 9 adapted to provide a plurality of drive ratios, and a secondary transmission mechanism 10 adapted to provide either an underdrive or an overdrive gear ratio. If the primary transmission mechanism, by way of example, provides five drive gear ratios, it will be seen that the use of the secondary two-speed, over-and-under-drive transmission in series therewith necessarily results in ten possible drive ratio combinations through the overall power transmitting mechanism.

The drive ratio of the primary transmission mechanism is selectively controlled by a manually operable shift or drive selector lever 11 independently of the drive ratio established in the secondary transmission unit. The drive ratio control mechanism for the secondary transmission includes a selector valve 12 operable to selectively and alternatively supply a pressurized actuating fluid such as air either through a low speed gear shift pressure line 13 or through a high gear shift pressure line 14 to opposite ends of a servo motor device 15 which is adapted to actuate a gear shifting lever 16 between a first position indicated at $a$ and a second position indicated at $b$ to establish either underdrive or overdrive operation, respectively. Constant air pressure for actuating the servo motor 15 is supplied to the selector valve 12 through a pressure line 17 from pressure regulator valve 18 which is connected through a pressure line 19 to a suitable source of air pressure, indicated at P, such as an engine driven pump or blower and an air receiver. The selector valve 12 is actuable by a Bowden wire 11' and, while alternatively supplying actuating air pressure to one end of the servo motor 15, simultaneously vents the deenergized end of the servo motor to the atmosphere.

The speed and torque of the engine are controlled between a minimum idle speed and two alternative maximum speed limits by the fuel controlling action of a combined throttle and governor mechanism indicated at G; the two maximum speed limits being selectively established in response to the drive ratios of the transmission units 9 and 10 by a governor control mechanism constructed in accordance with the invention.

The governor control mechanism includes a servo motor 21 operable to adjust a speed maintaining biasing means associated with the governor, e. g. a speeder spring assembly. A pressure line 22 connects the servo motor 21 with a two-way check valve 23. The check valve 23 may be of any suitable construction, but in the illustrative embodiment shown in Figure 2 comprises a valve body 24 having oppositely disposed inlet chambers 25 and 26 and a single intermediate outlet chamber 27 connected to the line 22. Fluid flow through the check valve 23 is controlled by a floating valve member 28 which is reciprocably mounted in a radially ported cylindrical sleeve 29 which extends between and embraces two annular valve seats 30 and 31.

The inlet chamber 26 of the check valve 23 is connected to the low speed gear shift pressure line 13 by a pressure line 32 and is thus connected to the pressure supplying regulator valve 18 whenever the selector valve 12 is in its underdrive establishing position. The opposite inlet port 25 is connected through a pressure line 33 to an outlet chamber 34 of a control valve 35 which is operable in accordance with the drive ratio of the primary transmission mechanism 9 to either vent the chamber 34 to the atmosphere or to connect it to the pressure supplying regulator valve 18 through a pressure line 20.

The control valve 35, in the form shown in Figure 2, includes a tubular valve body assembly 36 which is suitably mounted at one end in an opening 41 in a shift bar housing 42. The opening 41 is so located in the housing 42 as to intersect a bore 43 which reciprocably mounts a shift control rod 44 forming a part of the primary transmission control mechanism. A series of coaxially aligned bores and counterbores 37, 37', 38, 39 and 40 extending through the valve body are adapted to reciprocably mount certain elements of the valve and provide necessary spring and valve seating shoulders. The upper end of the counterbore 40 is closed by an adapter 49 to form a valve inlet chamber 45 which is connected to the regulator valve 18 by the pressure line 20. A valve member 46 is reciprocably mounted in the counterbore 40 and is normally biased by a spring 47 and the air pressure supplied to the chamber 45 toward its closed position against a valve seating shoulder 48 formed by the opposite end of the counterbore 40. A second valve member 50 of stepped diameters is reciprocably mounted in the adjacent counterbores 37' and 38; an O-ring 51 sealing the valve member 50 with respect to the counterbore 37'. A spring 52 normally biases the valve member 50 into thrust engagement with a valve actuating plunger 53 which is reciprocably mounted in bore 37 and counterbore 37'. When the valve member 50 is in the position shown in Figure 2, a passage 54 formed therein by an axially extending bore and an intersecting diametrical bore serves to vent the outlet chamber 34 to the atmosphere through an axially extending slot 55 provided in the valve body. However, the plunger 53 has a conical end adapting it to be actuated upwardly when the shift bar 44 is shifted from its high speed drive ratio position, shown in full lines in Figure 2, to a low or intermediate drive ratio establishing position, such as shown in broken lines. Such a shift in the primary transmission control mechanism is accomplished by movement of the control lever 11 from its high speed ratio establishing position shown in full lines in Figure 1 to either a low or intermediate drive ratio establishing position as indicated in broken lines at c and d, respectively. Such a shift results in the upward actuation of the valve member 50. When thus actuated, the initial movement of the valve member 50 causes the lower end of the valve member 50 to close the vent port 55. Subsequent upward movement brings the upper end face of the valve member 50 into sealed engagement with the valve member 46 and serves to actuate the member to its valve open position thus tending to supply actuating air through the check valve 23 to the governor adjusting servo 21.

It will be seen from the foregoing description that the control valve 35 is normally operable by the shift control mechanism of the primary transmission to supply air pressure to the governor adjusting servo mechanism 21 when the primary transmission is in its low and intermediate drive ratios. This air pressure acting through the servo 21 adjusts the governor to maintain the higher of the two maximum engine speeds. When the primary transmission is shifted to its high speed drive ratio, the control valve 35 serves as a check valve preventing the flow of fluid pressure from the regulator valve and vents the pressure line 33 to atmosphere. If the selector valve 12 is in its underdrive position when the primary transmission is shifted to its high speed drive ratio, the actuating pressure supplied through the line 13 to the secondary transmission controlling servo motor 15 is also supplied through the pressure line 32 to the inlet chamber 26 of the two-way check valve 23. This pressure shifts the valve member 28 into sealing engagement with the seat 30 as the pressure in the line 33 is vented and maintains the governor servo mechanism in its high speed maintaining condition. However, if the selector valve is then shifted to its high speed or overdrive ratio establishing position, the resultant venting of the low gear ratio establishing side of the servo 15 also vents the governor control servo to atmosphere. This reduces the speed maintaining biasing action of the governor thus permitting the governor to control the engine at its lower maximum speed setting. It should be noted that the valve member 28 of the two-way check valve 23 will always remain in its shifted position until the pressure originating the valve shift is vented from that particular inlet chamber due to the reduced area exposed to the pressure air on the valve-closed side.

As shown in Figures 3 and 4, the governor mechanism is preferably of the type shown and described in copending United States patent application S. N. 426,868, entitled "Control Mechanism," filed April 30, 1954, in the names of Charles H. Frick and Glenn R. Hickson. This governor mechanism comprises a speed responsive centrifugal assembly A adapted to actuate a fuel controlling throttle mechanism B in a fuel decreasing direction in opposition to a fuel increasing biasing action of a speeder spring assembly C.

The speed responsive centrifugal assembly A includes a short shaft 60 journaled at one end in the governor casing and adapted to be drivingly connected to the engine at its opposite end. A pair of relatively heavy low speed centrifugal weight members 61 and a pair of lighter high speed centrifugal weight members 62 are pivotally mounted by a weight carrier 63 suitably secured to the shaft 60. When the shaft 60 is rotated, the centrifugal forces acting on the weight members tend to swing them radially outwardly about their respective pivots. The centrifugal members 61 are so formed as to abut the carrier 63 after the members have swung outwardly to a limited extent and have axially extending abutments 61' thereon which engage and swing the lighter members outwardly during low speed operation. The lighter high speed weights 62 are provided with inwardly extending cam cranks which transmit the speed responsive outward swinging of these weights through a riser sleeve 65 and an anti-friction bearing 66 to a power lever assembly 67 including a lower bifurcated arm 68 in thrust engagement with the ball bearing 66, an intermediate shaft portion 69 suitably journaled in the casing, and an upper bell crank lever portion 70 mounted on the upper end of the shaft. The speed responsive outward movement of the weights 61, 62 actuates the bell crank lever 70 in a clockwise direction as viewed in Figure 3. As indicated above, this movement is opposed and balanced by the speeder spring assembly C; one arm of the bell crank lever 70 carrying a screw 71 adjustably engaging a plunger cap 76' of the speeder spring assembly.

In addition to the cap 76', the speeder spring assembly C includes a high speed maintaining spring 73 compressibly interposed between a spring seating boss formed externally on a sleeve 73' and the axially spaced end of a second spring seating sleeve 73". The sleeve 73" slidably embraces the adjacent end of the sleeve 73'. The opposite end of the sleeve 73' is reciprocably mounted in a casing web and the spring seating boss on the sleeve serves as a stop adapted to abut the web thereby limiting movement of the sleeve in a fuel increasing direction. The sleeve 73" is reciprocably mounted in a sleeve 74 which is theadably mounted in and projects from an opening in the governor casing proper. A second speeder spring 75 is operable to provide a fuel modulating biasing action at intermediate engine speeds and is compressibly interposed between a sleeve 75' reciprocably mounted in the sleeve 73' and a second sleeve 75" adjustably threaded in the sleeve 73'. A third spring 76 is operable to maintain engine idle speed and is compressibly interposed between the cap 76' which is reciprocably mounted in the sleeve 75' and a spring seating spindle 76" which is threadably mounted in the sleeve 75" and extends axially through the sleeves 75' and 75", and the interposed spring 75. The several speeder springs and spring seating members are thus arranged to sequentially oppose and balance the speed responsive biasing action or movement of the weights 61 and 62.

The other arm of the lever 70 carries a pin 78 pivotally mounting a floating differential lever 79 intermediate its ends. The lever 79 is pivotally connected at 80 to an engine fuel rack controlling link 81. The lever 79 is thus operable to control the engine fuel supply and thereby engine speed in accordance with the spring balanced speed responsive movement of the pivot pin 78 and the movement of a second pivot pin 82. The pin 82 is carried by a lever arm 83 which is secured to the lower end of a shaft 84 which is rotatably supported in a detachable cover member closing the upper portion of the governor housing. A lever arm 85 is secured to the upper end of the shaft 84 and is connectible to suitable throttle actuating mechanisms, not shown. The pivot pin 82 is sandwiched between and engages the end of the lever 79 opposite the link 81 and a torsion spring 86 carried by the lever. Hence, rotation of the throttle control lever 85 moving the pin 82 to the right, as viewed in Figure 4, is in opposition to the spring 86 and tends to move the differential lever 79 in a fuel increasing direction about the pivot pin 78 whereas rotation of lever 85 in a fuel-decreasing direction is transmitted positively to the lever 79. The throttle control lever acting through the differential lever 79 is thus normally operable to control the engine between the governor controlled idle and maximum speed conditions. However, a cam roller 87 is rotatably mounted on the lever 79 and is adapted to engage a cam 88 adjustably mounted within the governor casing. The contour of the cam 88 is such as to modulate the fuel supply controlling movement of this lever during periods of engine acceleration thereby limiting the increasing fuel supply to the engine in accordance with engine speed.

As best seen in Figure 4, the governor adjusting servo 21 comprises a cylinder 90 threadably mounted on the sleeve 74. A piston 91 is reciprocably mounted within the cylinder and is adapted to thrustably engage the end of the sleeve 73" which projects from the sleeve 74. The application of fluid pressure to the cylinder through the line 22 shifts the piston 91 into abutment with the end of the sleeve 74 thus shifting the sleeve 73" to compressibly increase the biasing action of the high speed spring 73 and thereby the maximum governed engine speed. When the cylinder 90 is vented the speeder spring acts to return the sleeve 73" until the spring seating boss thereon abuts the end of the sleeve 74. This reduces the biasing action of the spring 73 and hence the governed maximum engine speed.

While only one illustrative embodiment of the invention has been shown for the purpose of illustration, it will be obvious to those skilled in the art that numerous modifications can be made therein without departing from the spirit and scope of the invention as defined in the following claims.

We claim:

1. A control mechanism for a power train including en engine and a plural speed transmission mechanism adapted to be driven by said engine, said transmission mechanism including a primary change speed transmission unit, a secondary change speed transmission unit drivingly connected to said primary transmission unit, and a clutch mechanism drivingly interconnecting said engine to at least one of said transmission units, said control mechanism comprising, in combination, a first means for controlling the drive ratio of said primary transmission unit, a second means independent of said first means for controlling the drive ratio of said secondary transmission unit, an engine fuel regulating means including linkage means normally operable between an idle spede fuel supply condition and a full engine speed and torque fuel supply condition, an engine governor means operable through said fuel regulating means to limit operation of said engine to a predetermined maximum speed, a fluid pressure means effective to modify operation of said governor means to limit the engine to a different predetermined maximum engine speed, a source of fluid pressure, a first valve mechanism for controlling the application of pressure fluid from said source to and from said fluid pressure means in accordance with the operative position of said first transmission control means, and a second valve mechanism for controlling the application of pressure fluid from said source to and from said fluid pressure means in accordance with the operative position of said second transmission control means.

2. A control mechanism for a power train including an engine, a primary multiple speed transmission mechanism, a secondary multiple-speed transmission mechanism, said primary and said secondary transmission mechanisms being drivingly interconnected and adapted to provide a plurality of drive ratio combinations, and a coupling device for drivingly connecting at least one of said transmission mechanisms to said engine, said control mechanism comprising, in combination, a first means for controlling the drive ratio of said primary transmission mechanism, a second means independent of said first means for controlling the drive ratio of said secondary transmission mechanism, an engine fuel regulating means normally operable between a no-fuel supply condition and full engine speed and torque fuel supply condition, an engine governor means operable on said fuel regulating means to limit operation of said engine between a predetermined idle speed and a predetermined maximum speed, a control lever movable freely from an idle position to a full engine speed and torque position and directly operable on said fuel regulating means to provide fuel supply control at engine speeds intermediate said governor controlled limits, and means effective in one cooperative drive ratio combination provided by said transmission control means to modify operation of said governor means to limit the engine to a different predetermined maximum engine speed, said last-mentioned means including a speeder spring associated with said governor means and normally effective to establish one of said predetermined engine speed limits, a fluid motor operable to modify the speed controlling biasing action of said spring, a source of fluid pressure, a first valve means for controlling the application of pressure fluid from said source to said fluid motor in accordance with the operative position of said primary transmission control means, and a second valve means for controlling the application of pressure fluid from said source to said fluid motor in accordance with the operative position of said secondary transmission control means.

3. A control mechanism for a power train including an engine and a plural speed transmission mechanism adapted to be driven by said engine, said transmission mechanism including a primary change speed transmission unit, a secondary change speed transmission unit drivingly connected to said primary transmission unit, and a clutch mechanism drivingly interconnecting said engine to at least one of said transmission units, said control mechanism comprising, in combination, a first means operable to control the drive ratio of said primary transmission unit, a second means independent of said first means and operable to control the drive ratio of said secondary transmission unit, an engine fuel regulating means normally operable between a no-fuel supply condition and a full engine speed and torque fuel supply condition, an engine governor means operable on said fuel regulating means to limit operation of said engine to a predetermined maximum speed, a control lever movable freely from an idle position to a full engine speed and torque position and directly operable on said fuel regulating means to control the engine fuel supply and thereby engine speed below said governor controlled limit, a fluid motor operable to modify operation of said governor means to limit the engine to a different predetermined maximum engine speed, a source of fluid pressure, and valve means for controlling the application of pressure fluid from said source to said fluid motor in accordance with the overall drive ratios established through said transmission mechanism by the cooperative interaction of said transmission control means, said valve means including a two-way check valve having an outlet connected to said fluid motor and having two inlets alternately connectible to said fluid pressure source, a second valve responsive to the drive ratio control means of said primary transmission unit and operable to connect one of said check valve inlets to said pressure source when said primary transmission unit is in its low and intermediate speed drive ratios and operable to vent said one inlet to atmospheric pressure when said primary transmission unit is in its high speed drive ratio, and a third valve responsive to the drive ratio control means of said secondary transmission unit and operable to connect the other of said check valve inlets to said pressure source when said secondary transmission unit is in its low or intermediate speed drive ratios and operable to vent said other inlet to atmospheric pressure when said secondary transmission unit is in its high speed drive ratio.

4. In a power plant including an engine, a primary multiple drive ratio transmission mechanism, a secondary multiple drive ratio transmission mechanism, said primary and said secondary transmission mechanisms being drivingly interconnected and adapted to provide a plurality of drive ratio combinations, and a coupling device for drivingly connecting said transmission mechanisms to said engine, control mechanism comprising, in combination, a first transmission control operable to control the drive ratio of said primary transmission mechanism, a second transmission control means operable to control the drive ratio of said secondary transmission mechanism independently of said first transmission control means, an engine fuel regulating means, a speed responsive means, biasing means adapted to act in opposition to said speed responsive means and normally operable on said fuel regulating means to limit said engine to a predetermined maximum engine speed, lever means operatively connected to and acting between said speed responsive means, and biasing means, and said fuel regulator, means for adjusting the biasing action of said biasing means whereby the maintained maximum engine speed is changed to a different predetermined speed, a first bias control means adapted to control the operation of said adjusting means in accordance with the operation of said first transmission control means, and a second bias control means adapted to control the operation of said adjusting means in accordance with the operation of said secondary transmission, said first and second bias control means being arranged in parallel relationship and operable in at least one cooperative position of said transmission control means to actuate said adjusting means to ecect the change in the maximum engine speed maintaining biasing action of said biasing means.

5. In a power plant including an engine, a primary transmission mechanism, a secondary transmission mechanism, said primary and said secondary transmission mechanism being drivingly interconnected and adapted to cooperate to provide a plurality of drive ratio combinations, and a coupling device for drivingly connecting at least one of said transmission mechanisms to said engine, control mechanism comprising, in combination, means for independently controlling the drive ratios of said primary and said secondary transmission mechanisms, an engine fuel regulating means, a speed responsive means, lever means operatively connected to and acting between said speed responsive means and said fuel regulator, biasing means including a spring adapted to engage said lever means to resist movement of said speed responsive means and being normally effective on said fuel regulating means to limit the engine to a predetermined maximum speed, and spring adjusting means for said spring effective in one drive ratio establishing cooperative position of said transmission control means to change the particular engine speed limit maintained thereby to a different predetermined engine speed, said spring adjusting means including a fluid motor operable to modify the biasing action of said spring, a source of fluid pressure, and separate valve means independently responsive to said drive ratio controlling means and the individual drive ratios established thereby in said primary and secondary transmission mechanisms and operable to control the application of pressure fluid from said source to said fluid motor when either of said transmission mechanisms is in low or intermediate speed drive ratios and to vent said motor to atmosphere when both of said transmission mechanisms are in their high speed drive ratio operative conditions.

6. In a power train including an engine and a plural speed transmission mechanism adapted to be driven by said engine, said transmission mechanism including a plurality of drivingly interconnected transmission units adapted to provide a plurality of selective drive ratio combinations between said engine and an output shaft, and a clutch mechanism drivingly interconnecting said engine to at least one of said transmission units, a control mechanism comprising, in combination, a first means for controlling the drive ratio of one of said transmission units, a second means including a fluid pressure actuating means operable to control the drive ratio of another of said transmission units independently of said first means, an engine fuel regulating means including linkage means normally operable between an idle speed fuel supply condition and a full engine speed and torque fuel supply condition, an engine governor means operable through said fuel regulating means to limit operation of said engine to a predetermined maximum speed, a fluid pressure means effective to modify operation of said governor means to limit the engine to a different predetermined maximum engine speed, a source of fluid pressure, a first valve mechanism operable to control the application of pressure fluid from said source to and from said governor modifying fluid pressure means in accordance with the operative position of said first transmission control means, and a second valve mechanism operable to control the application of pressure fluid from said source to and from said second drive ratio controlling fluid pressure means and said governor modifying fluid pressure means.

References Cited in the file of this patent

UNITED STATES PATENTS

| | | |
|---|---|---|
| 2,443,084 | Rhodes | June 8, 1948 |
| 2,474,316 | May et al. | June 28, 1949 |
| 2,771,788 | Frick et al. | Nov. 27, 1956 |